(12) United States Patent
Wildman

(10) Patent No.: US 8,684,309 B2
(45) Date of Patent: Apr. 1, 2014

(54) BRACKET

(75) Inventor: Eric Wildman, Bristol (GB)

(73) Assignee: Airbus Operations Limited, Bristol (GB)

( * ) Notice: Subject to any disclaimer, the term of this patent is extended or adjusted under 35 U.S.C. 154(b) by 86 days.

(21) Appl. No.: 13/495,777

(22) Filed: Jun. 13, 2012

(65) Prior Publication Data

US 2013/0001360 A1    Jan. 3, 2013

(30) Foreign Application Priority Data

Jun. 28, 2011    (GB) .................................. 1110973.3

(51) Int. Cl.
*B64C 3/00* (2006.01)

(52) U.S. Cl.
USPC ...................... 244/123.1; 244/119; 244/117 R

(58) Field of Classification Search
USPC ................ 244/123.1, 119, 120, 117 R, 123.7
See application file for complete search history.

(56) References Cited

U.S. PATENT DOCUMENTS

| | | | | |
|---|---|---|---|---|
| 4,219,980 | A * | 9/1980 | Loyd ............................. | 52/309.1 |
| 6,114,012 | A * | 9/2000 | Amaoka et al. ............... | 428/182 |
| 7,293,394 | B2 * | 11/2007 | Davis ............................. | 52/838 |
| 7,380,753 | B2 * | 6/2008 | Kairouz ...................... | 244/123.1 |
| 8,186,621 | B2 * | 5/2012 | Manzano ...................... | 244/131 |
| 8,186,622 | B2 * | 5/2012 | Munday ........................ | 244/132 |
| 2006/0169400 | A1 * | 8/2006 | Wilding et al. ............... | 156/245 |
| 2010/0044511 | A1 * | 2/2010 | Coulter et al. .............. | 244/123.1 |
| 2010/0065687 | A1 * | 3/2010 | Douglas ........................ | 244/130 |
| 2010/0148008 | A1 * | 6/2010 | Hernando Sebastian et al. .............................. | 244/131 |
| 2010/0170986 | A1 * | 7/2010 | Lafly et al. .................... | 244/119 |
| 2010/0176241 | A1 * | 7/2010 | Meyer et al. .................. | 244/119 |
| 2012/0223183 | A1 * | 9/2012 | Boursier et al. ........... | 244/118.1 |
| 2012/0267478 | A1 * | 10/2012 | Dazet ............................. | 244/119 |
| 2013/0001360 | A1 * | 1/2013 | Wildman ................... | 244/123.1 |
| 2013/0062467 | A1 * | 3/2013 | Soenarjo .................... | 244/123.1 |

OTHER PUBLICATIONS

UK Search Report for GB Application No. 1110973.3, mailed Sep. 28, 2011.

* cited by examiner

*Primary Examiner* — Christopher P Ellis
*Assistant Examiner* — Medhat Badawi
(74) *Attorney, Agent, or Firm* — Nixon & Vanderhye P.C.

(57) ABSTRACT

An integrated bracket assembly for attachment to a convex outer corner surface of a torsion box of an aerofoil structure, the bracket assembly comprising a bracket strip having a plurality of brackets arranged spaced side by side, and connected by an infill rail integrally formed with the bracket strip, wherein the infill rail has a concave surface for mating with the convex surface of the torsion box. The torsion box may be of a "U-box" construction where a front spar and a rear spar are integrally formed with either an upper or lower torsion box cover to form an omega-shaped unitary component, and the other cover is attached to the omega-shaped component to provide an enclosed volume. The bracket strip may be used for attaching a leading/trailing edge structure of the aerofoil to the torsion box.

19 Claims, 5 Drawing Sheets

BRACKET

This application claims priority to GB Application No. 1110973.3 filed on Jun. 28, 2011, the entire contents of which is hereby incorporated herein by reference.

FIELD OF THE INVENTION

The present invention relates to a bracket for a torsion box of an aerofoil structure.

BACKGROUND OF THE INVENTION

An aerofoil structure typically comprises a torsion box structure, which includes one or more longitudinal spars, a plurality of transverse ribs, and is enclosed by structural covers. Aerofoil structures may be found in a variety of aircraft, spacecraft and wind turbine applications, for example.

When applied to aircraft wings and stabilizers the torsion box is often referred to as the "wing box". A wing box construction used commonly in transport aircraft includes a front spar, a rear spar, an upper wing cover (skin) extending between the front spar and the rear spar, and a lower wing cover (skin) extending between the front spar and the rear spar. The front and rear spars may be formed as a C-section with upper and lower flanges extending from an upstanding web. The upper and lower wing covers may be attached to the flanges of the front and rear spars. Leading and trailing edge structures of the wing, such as the leading edge D-nose and leading/trailing edge access panels, may be supported by butt-straps attached to overhanging edges of the upper and lower covers.

The use of composite materials to replace traditional metallic aerospace materials provides opportunities to improve the wing box construction. In particular, it has recently been proposed to integrally form the front and rear spars with either the upper wing cover or the lower wing cover to form an Omega-shaped unitary component. Structural components, such as ribs, and aircraft systems can be installed within the Omega-shaped component before the other wing cover is attached to close the wing box. The Omega wing box is also known as a "U-box" when the lower cover is combined with the spars.

Combining the lower (or alternatively upper) wing cover with the spars eliminates the cover overhang traditionally used to support the leading/trailing edge structures.

SUMMARY OF THE INVENTION

A first aspect of the invention provides an aerofoil structure, comprising: a torsion box including a front spar, a rear spar, an upper cover extending between the front spar and the rear spar, and a lower cover extending between the front spar and the rear spar, wherein the front spar and the rear spar are integrally formed with one of the covers to form an omega-shaped unitary component, and the other cover is attached to the omega-shaped component to provide an enclosed volume; and a bracket assembly comprising: a bracket strip having a plurality of brackets attached to the omega-shaped component adjacent the integrally formed cover; and an infill rail arranged between the bracket strip and the omega-shaped component, wherein the infill rail has a concave surface for mating with a convex outer corner surface of the omega-shaped component.

A further aspect of the invention provides an integrated bracket strip for attachment to a convex outer corner surface of a torsion box of an aerofoil structure, the bracket strip comprising a plurality of brackets arranged spaced side by side and connected by an infill rail integrally formed with the brackets, wherein the infill rail has a concave surface for mating with the convex surface of the torsion box.

The invention is advantageous in that the bracket strip can provide fixing points for attaching leading/trailing edge structures of the aerofoil to the torsion box.

The aerofoil structure may further comprise a panel attached to the torsion box by the bracket strip.

The infill rail can fill a gap between the panel and the integrated cover of the torsion box to provide a substantially continuous outer aerodynamic surface.

The bracket strip may additionally, or alternatively, be used to connect cabling and/or aircraft systems routes to the torsion box.

The aerofoil structure may be an aircraft fixed main wing. Alternatively, the aerofoil structure may be an aircraft horizontal or vertical stabilizer, or any other suitable aerofoil structure such as a wind turbine blade or a rotary aircraft wing, for example.

The bracket strip and the infill rail may be integrally formed.

The brackets may be arranged spaced side by side. A spacing between the brackets helps minimise induced spanwise loads due to bending of the torsion box.

Each bracket may comprise a shoe fitting having a generally L-shaped bracket with lateral side supports.

The bracket strip may further comprise a flexible connection extending between at some adjacent pairs of the brackets. For example, the flexible connection may extend between oppositely facing side supports of the spaced adjacent shoe fittings. The flexible connections are preferably integrally formed and help maintain the integrity of the bracket strip during installation, whilst substantially isolating loads in the adjacent brackets during use when attached to the torsion box.

The spacing between the brackets may be regular, or may be irregular. The brackets may have a commonly dimensioned bracket width, or the bracket widths may be differently dimensioned. For high volume production, it may be beneficial that the bracket strip has regularly sized and spaced brackets, such that the strip can be cut to length from a continuously moulded product. Alternatively, the bracket strip may be a bespoke, or limited volume, part with irregularly sized and/or spaced brackets.

The bracket at one end of the strip may further include an integrally formed infill block. The infill block may be an integrally formed solid block on an end side of an end bracket. It may be beneficial to increase the volume of material on an end bracket to increase the stiffness of the end bracket which has no neighbouring outboard bracket to help support it. This may reduce induced deflection in the end bracket so as to ensure it remains clear of any adjacent components within tolerance.

The infill rail preferably forms a step with the brackets. The step may form a recess used to receive a leading/trailing edge structure of the aerofoil that is attached via the bracket strip to the torsion box.

The brackets may be attached to the torsion box and/or to a leading/trailing edge structure of the aerofoil by fastening or bonding, for example. Where fasteners are used, the brackets may include fastener receiving holes. In the case of generally L-shaped brackets, a fastener hole in one arm of each L-shaped bracket may be used to fasten the bracket strip to the torsion box, and a fastener hole in the other arm of each L-shaped bracket may be used to fasten a leading/trailing edge structure of the aerofoil to the bracket strip. The arms of the L-shaped brackets may be set at approximately 90 degrees, but this angle may be in the range 70-110 degrees. It may be preferable to attach the bracket strip by adhesive bonding, rather than fastening. In particular, bonding may be preferred depending on the bracket material.

The bracket strip is preferably formed from thermoplastic material. Suitable thermoplastic materials includes high performance engineering thermoplastics such as PEEK, PEI, PEK, PEKK, etc. The thermoplastic material may be fibre-reinforced, with fibres of carbon, glass, etc. Preferably, the bracket strip is a moulded component.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
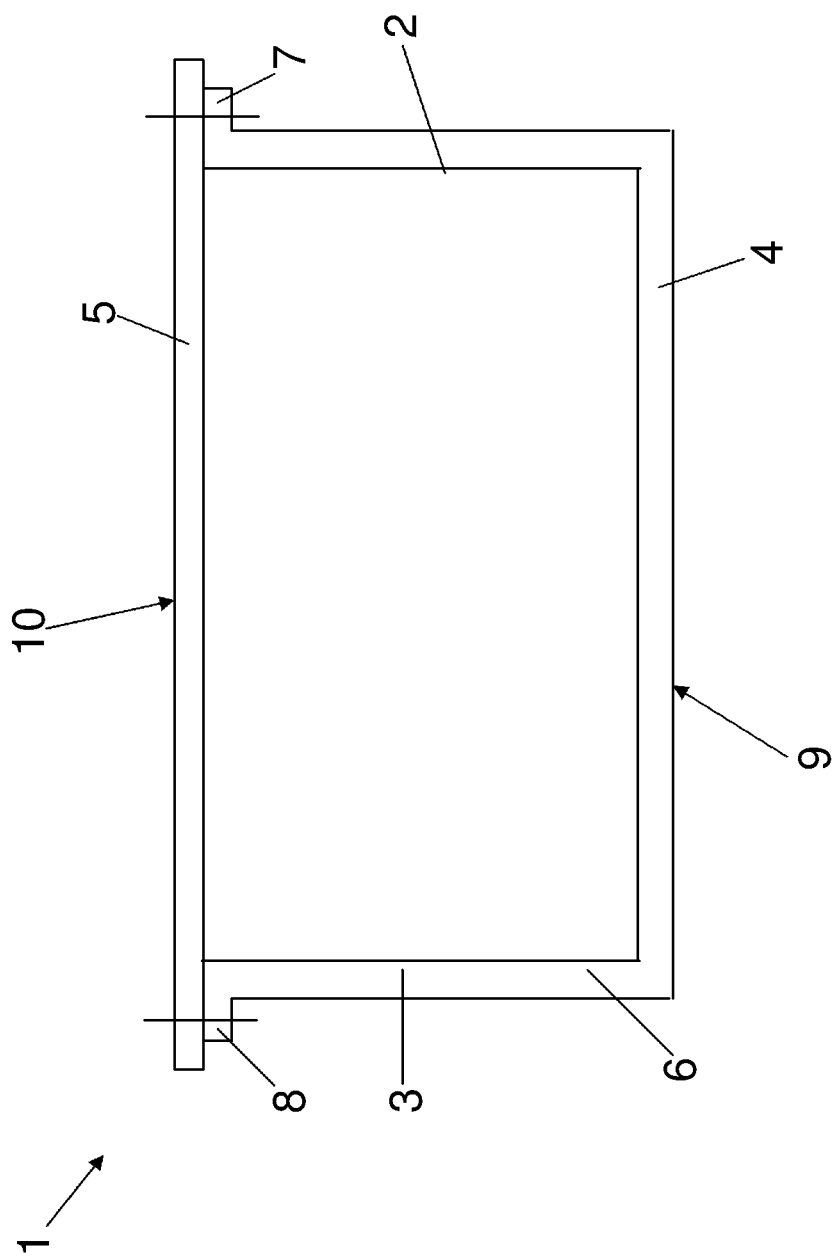
FIG. 1 illustrates schematically a section view of a "U-box" torsion box for an aircraft wing.

FIG. 1 shows a "U-box" torsion box 1 for an aircraft wing. The torsion box 1 includes a front spar 2, a rear spar 3, a lower wing cover 4, and an upper wing cover 5. The front spar 2 and the rear spar 3 are integrally formed with the lower wing cover 4 to form an "Omega" or "U" shaped unitary component 6. The upper wing cover 5 is attached to outwardly facing flanges 7, 8 of the front and rear spars 2, 3 respectively.

The upper cover 5 overhangs the spar flanges 7, 8. The outer surface 9 of the integrally formed lower cover 4 and the outer surface 10 of the upper cover 5 form outer aerodynamic surfaces of the aircraft wing. Leading and trailing edge structures (not shown in FIG. 1) are attached to the torsion box 1 to complete the aerofoil profile of the aircraft wing.

Figure 2:
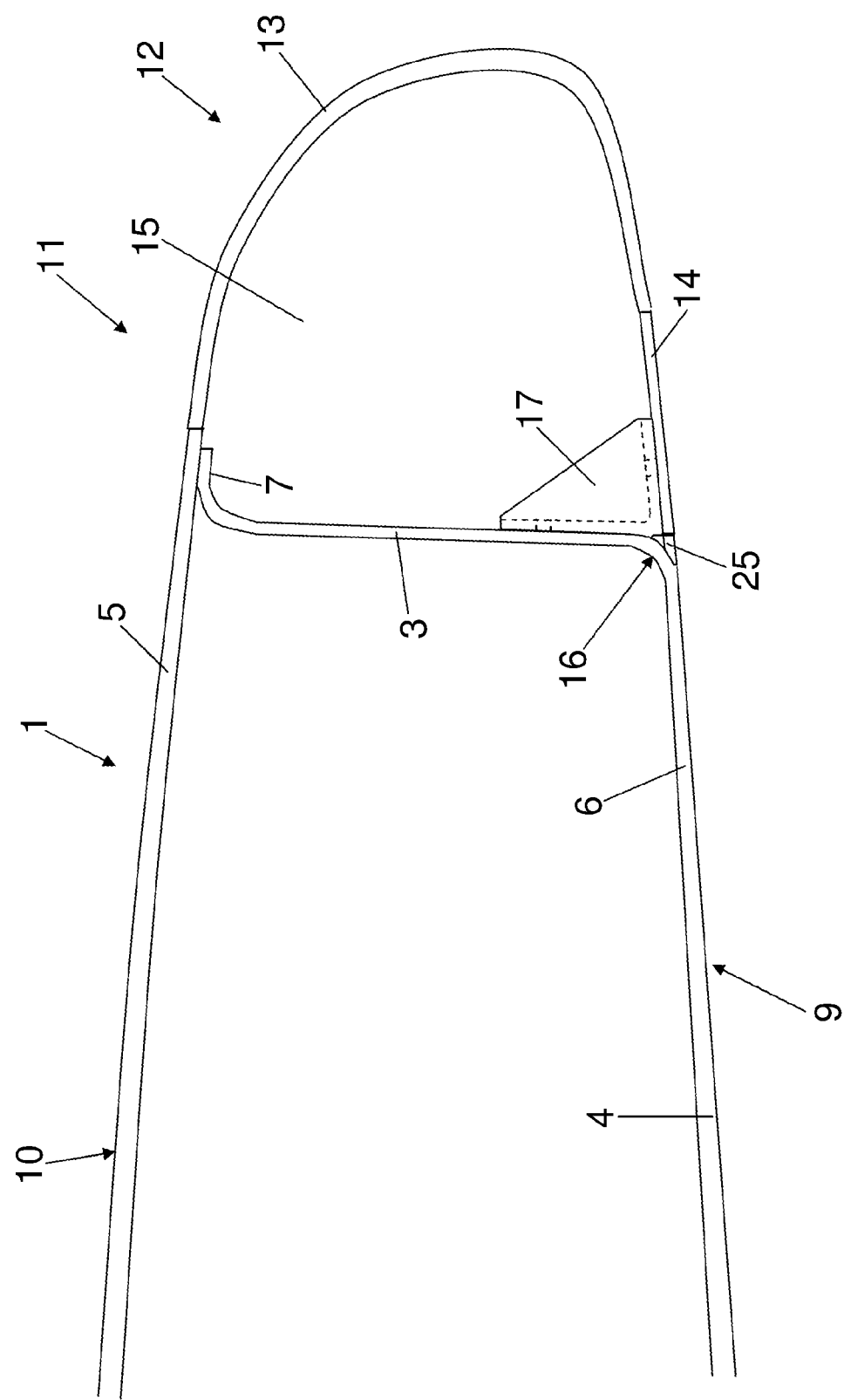
FIG. 2 illustrates schematically a section view of a leading edge of an aircraft wing having a U-box, showing a leading edge lower cover attached to the U-box lower edge by a bracket strip.

FIG. 2 illustrates a section view of a leading edge region of an aircraft wing 11 having the U-box portion box 1. The aircraft wing 11 includes a leading edge structure 12 comprising a D-nose panel 13 and a leading edge lower access panel 14. The D-nose panel 13 may be attached to the upper wing cover 5 by any suitable means, e.g. with a butt strap (not shown), for example. The D-nose panel 13 may be attached to the leading edge lower access panel 14 by any suitable means, e.g. with a butt strap (not shown), for example. The leading edge lower access panel 14 is a removable panel to permit access to the various aircraft systems (not shown in FIG. 2) housed within the leading edge cavity 15.

Since the Omega-shaped unitary component 6 combines the lower wing cover 4 with the front and rear spars 2, 3, the lower wing cover 4 does not overhang the front spar 3. Instead, the integrally formed Omega-shaped unitary component 6 of the U-box 1 features a lower front edge 16 as a smooth radiused bend between the integrally formed lower wing cover 4 and the front spar 3. Since there is no spar overhang at the lower leading edge of the U-box 1 a bracket assembly is used to attach the lower leading edge access panel 14 to the U-box 1. The bracket assembly includes a bracket strip 17, which extends generally spanwise across the lower front edge of the U-box 1.

Figure 3:
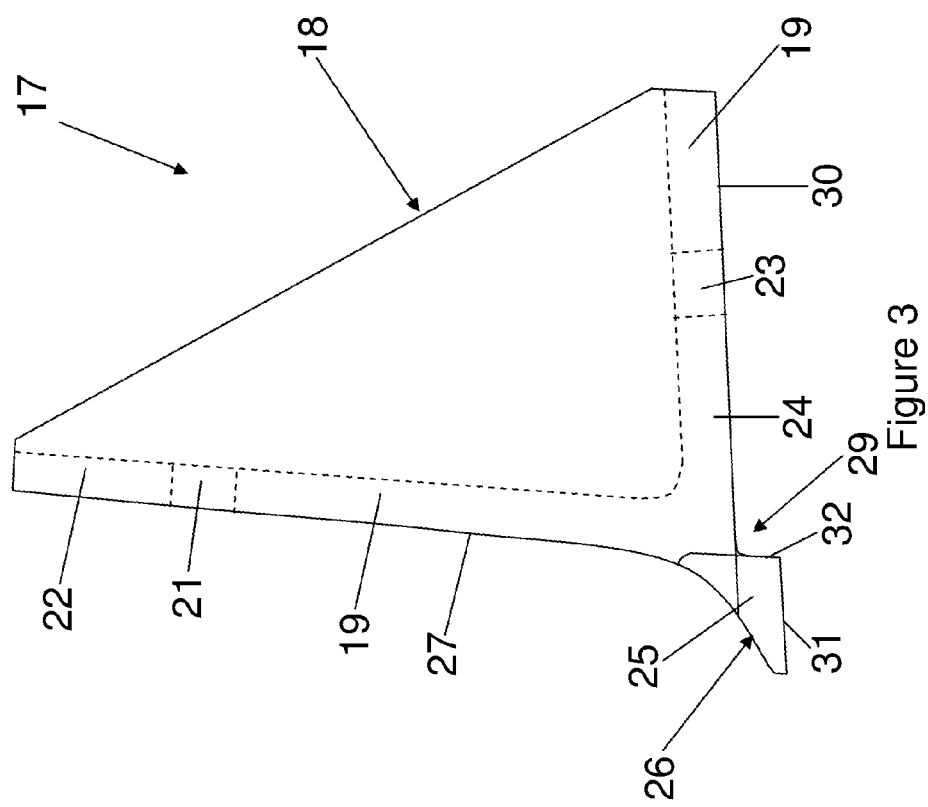
FIG. 3 illustrates an end view of the bracket strip.
Figure 4:
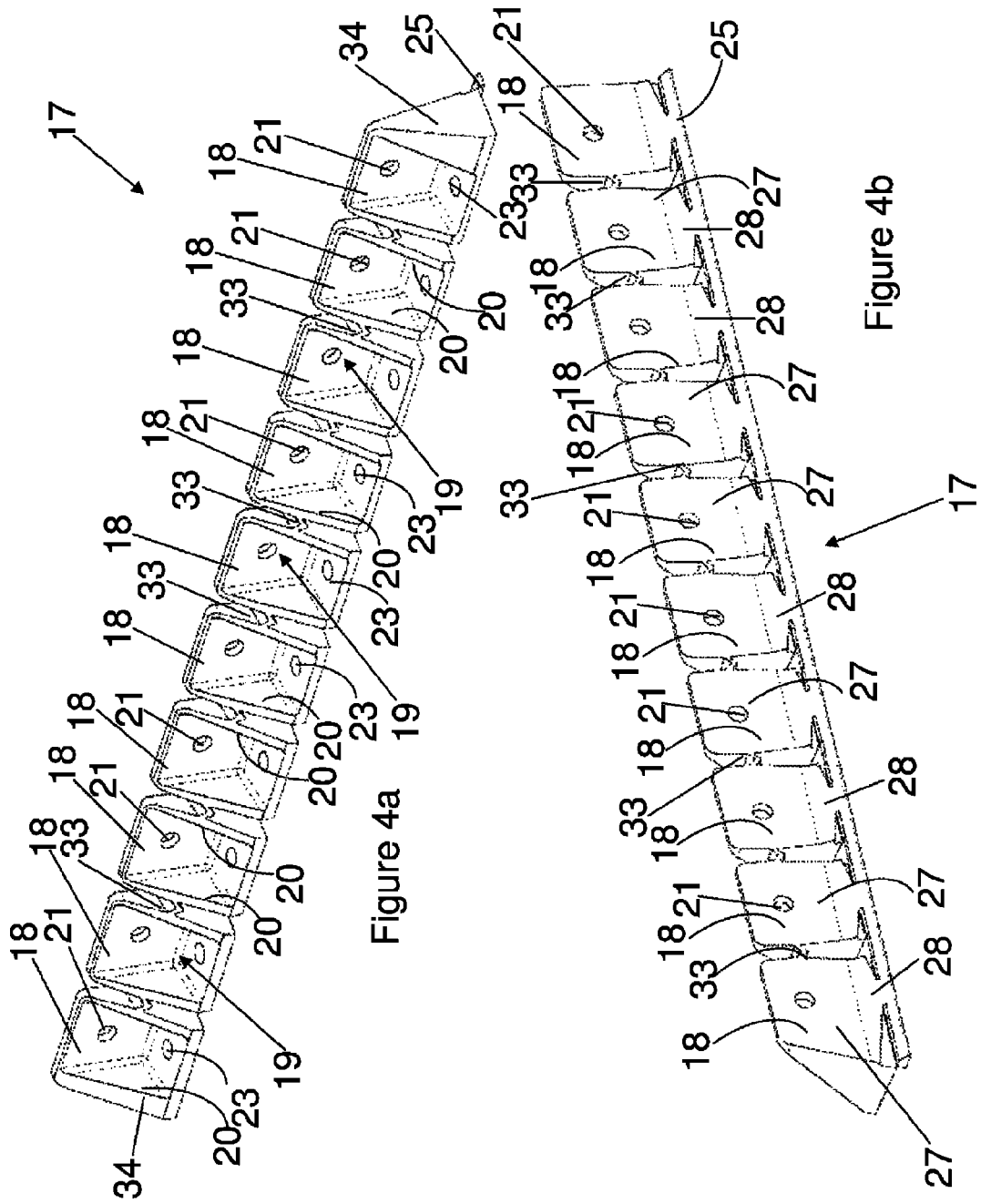
FIGS. 4a and 4b illustrate three dimensional views of the bracket strip.

FIGS. 3 and 4 illustrate the bracket strip 17 in detail. The bracket strip 17 includes a plurality of brackets each comprising a shoe fitting 18 having a generally L-shaped bracket part 19 with lateral side supports 20. The side supports 20 are generally triangular.

The shoe fittings 18 are adapted to be attached by fasteners. Each shoe fitting 18 has a fastener receiving through hole 21 formed in a generally upright arm 22 of the bracket 19, and a fastener receiving through hole 23 in the outwardly facing arm 24 of the generally L-shaped bracket 19. In an alternative embodiment (not shown) the shoe fittings may be bonded, rather than fastened, to the U-box 1 and/or the leading edge lower access panel 14 in which case the fastener holes 21 and 23 may be omitted. A combination of bonding and fastening may also be used.

The shoe fittings 18 are arranged spaced side by side and connected by an infill rail 25 integrally formed with each of the shoe fittings 18. The bracket strip 17 and the infill rail 25 together form the bracket assembly. Whilst in the example shown the infill rail 25 is integrally formed with the bracket strip 17, it will be appreciated that these may alternatively be separate parts. As can best be seen from FIG. 3, the infill rail 25 has a concave upper surface 26 for mating with the convex outer surface of the lower corner 16 of the U-box 1. The radius of the U-box lower corner 16 is relatively large and so the concave surface 26 of the infill rail 25 continues to smoothly blend into the substantially planar rear surface 27 of the shoe fitting 18, as can best be seen from FIG. 3. The overall profile of the bracket strip 17 therefore has a generally concave lower rear surface for mating with the convex outer surface of the corner 16 of the U-box 1.

As can best be seen from FIG. 4b, the rear surface 27 of each of the shoe fittings 18 is connected via a spine 28 to the infill rail 25. The infill rail 25 has a generally wedge shaped profile with a rearwardly facing taper. The infill rail 25 forms a step 29 with a lower surface 30 of the shoe fittings 18 so as to define a recess which receives the leading edge lower access panel 14.

Returning to FIG. 2, it can be seen that the leading edge lower access panel 14 is fixed against the lower surface 30 of the shoe fittings 18, and the wedge shaped infill strip 25 fills the gap between the leading edge lower access panel 14 and the lower edge corner 16 of the U-box 1. The infill strip 25 has a lower surface 31 which forms a substantially continuous lower aerodynamic surface for the aircraft wing 11 between the outer surface of the leading edge lower access panel 14 and the outer surface 9 of the lower wing cover 4. The lower surface 31 of the infill strip 25 is therefore set substantially flush with both the leading edge lower access panel 14 and the lower wing cover 4 to provide a substantially step free lower aerodynamic surface. The infill strip 25 has a forward surface 32 set substantially perpendicular to the lower surface 31 so as to form the step 29.

As can best be seen from FIGS. 4a and 4b, the plurality of shoe fittings 18 are connected not only by the infill strip 25 but also by a generally V-shaped flexible connection 33 extending between oppositely facing side supports 20 of the spaced adjacent shoe fittings 18. The flexible connections 33 together with the spines 28 connecting the shoe fittings 18 to the infill rail 25 ensure that the relatively rigid shoe fittings 18 are relatively flexibly connected such that when installed to attach the leading edge lower access panel 14 to the U-box 1, wing bending loads in the aircraft wing 11 does not manifest in induced stress in the leading edge lower access panel 14 and the remainder of the aircraft wing leading edge structure 12.

Whilst the flexible connections 13 are illustrated as being generally V-shaped it will be appreciated that other suitable flexible connection shapes may similarly be used. It will also be appreciated that whilst the flexible connections 33 are illustrated connecting between a central region of the side walls 20 of the adjacent shoe fittings 18, alternative flexible connections may be connected between the forward edges and/or the upper edges of the shoe fittings 18. The flexible connections need not be provided between each adjacent pair of shoe fittings 18 and may be omitted where a greater degree of load isolation is required between an adjacent pair of the shoe fittings 18.

Whilst the embodiments described above, the shoe fittings 18 are regularly spaced and are commonly dimensioned, both the dimensions of the shoe fittings and the spacing between adjacent shoe fittings may be varied along the length of the bracket strip.

As can best be seen in FIG. 4a, the shoe fittings 18 at each end of the bracket strip 17 are integrally formed with an infill block 34. The infill block provides an increased volume of material on the end shoe fittings. This may be used to increase the stiffness of the end shoe fittings.

Figure 5:
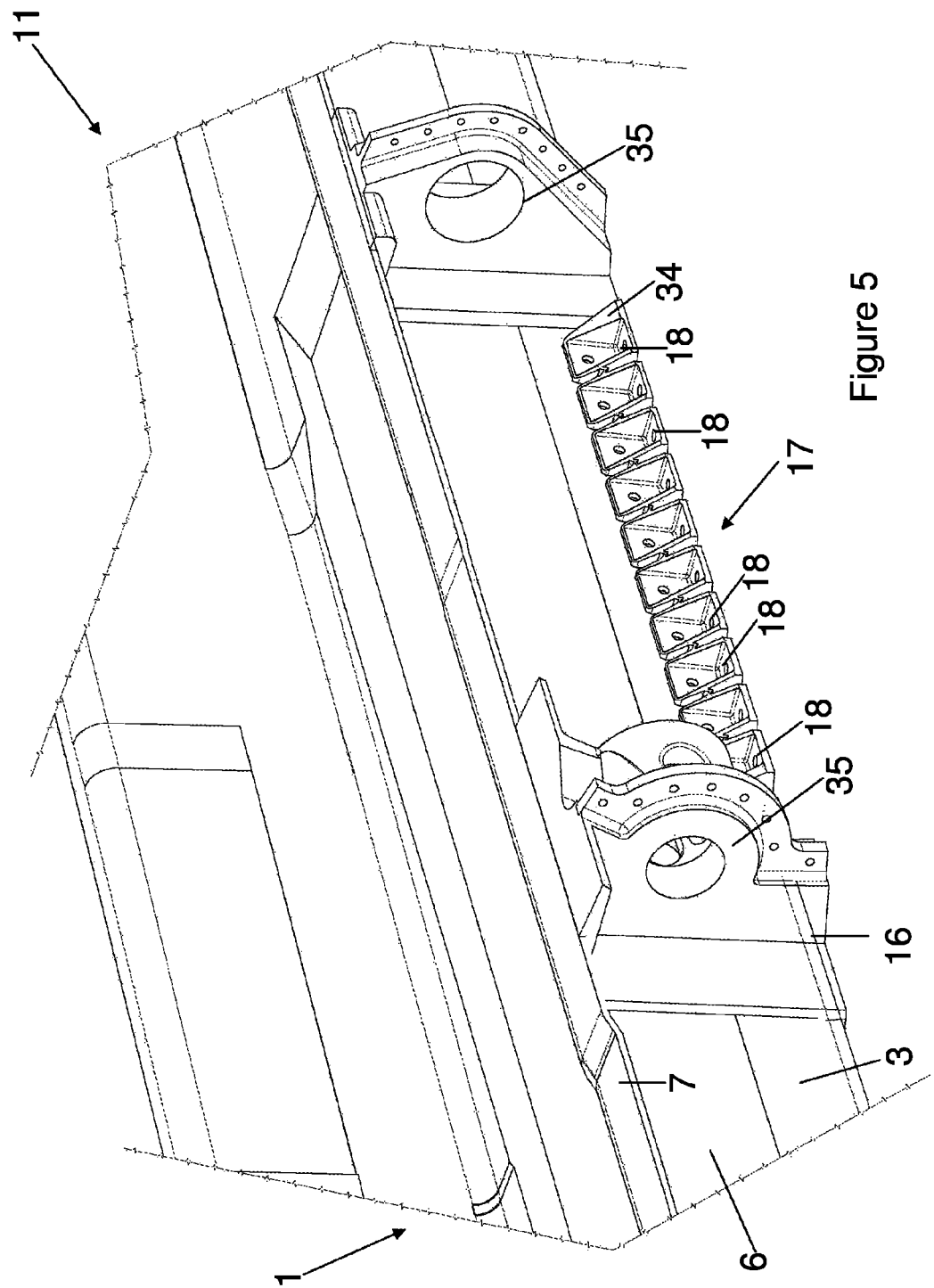
FIG. 5 illustrates a partial three dimensional assembly view of the bracket strip installed on the U-box lower edge.

FIG. 5 illustrates the bracket strip 17 installed on the lower front edge 16 of the U-box 1. The leading edge lower access panel 14 and the D-nose panel 13 have been omitted for clarity. The bracket strip 17 is installed between an adjacent pair of spoiler actuator hinge lugs 35 and the infill blocks 34 integrally formed with the ends of the bracket strip 17 are provided to reduce induced deflection in the end shoe fittings. This helps to ensure that the bracket strip 17 remains clear of any adjacent components within tolerance.

The bracket strip 17 is preferably a moulded fibre reinforced high performance thermoplastic composite. The thermoplastic resin may include PEEK, PEI, PEK, PEKK or any other suitable high performance thermoplastic. The reinforcing fibres may be of carbon or glass or any other suitable material. The fibres may be provided in the form of long fibres, woven fabrics, braided fabrics, unidirectional tape, discontinuous long fibres, or any other suitable fibrous materials. Preferably, the bracket strip is compression moulded using discontinuous long fibre reinforced high performance thermoplastic material. The fastener receiving through holes 21, 23 may be moulded-in during formation of the bracket strip 17.

The bracket strip 17 may additionally be used for securing cabling or other aircraft systems within the leading edge volume 15 to the U-box 1. For this purpose additional securing features or modified fixing bolts may be used for attachment of the cabling and/or systems.

The high performance fibre reinforced thermoplastic material used for the bracket strip 17 is sufficiently tactile/flexible to enable stress relieving features (the flexible connections 33 and the spines 28) to function appropriately and reduce induced stress from wing bending loads from being imparted into the fixing bolts (or adhesive bonding) used to attach the bracket strip 17 to the leading edge lower access panel 14.

Whilst in the embodiment described above, the bracket strip 17 is used to attach a leading edge lower access panel 14 to a lower front edge of a U-box torsion box, it will be appreciated that a similar bracket strip may be used to attach a trailing edge panel to a lower rear edge of the U-box 1. Similarly, if the U-box construction is "inverted" such that the Omega-shaped unitary component comprises the front and rear spars and the upper wing cover then the bracket strip may be used to attach the D-nose panel to the front spar and/or a trailing edge upper panel to the rear spar. It will be appreciated that for an inverted U-box construction the lower wing cover will overhang the outwardly facing flanges of the front and rear spars which may be used for attachment of the leading and trailing edge panel structures, e.g. in a conventional manner with butt straps.

Although the invention has been described above with reference to one or more preferred embodiments, it will be appreciated that various changes or modifications may be made without departing from the scope of the invention as defined in the appended claims.

The invention claimed is:

1. An aerofoil structure, comprising:
   a torsion box including a front spar, a rear spar, an upper cover extending between the front spar and the rear spar, and a lower cover extending between the front spar and the rear spar, wherein the front spar and the rear spar are integrally formed with one of the covers to form an omega-shaped unitary component, and the other cover is attached to the omega-shaped component to provide an enclosed volume; and
   a bracket assembly comprising: a bracket strip having a plurality of brackets attached to the omega-shaped component adjacent the integrally formed cover;
   and an infill rail arranged between the bracket strip and the omega-shaped component, wherein the infill rail has a concave surface for mating with a convex outer corner surface of the omega-shaped component.

2. An aerofoil structure according to claim 1, further comprising a panel attached to the torsion box by the bracket strip, and wherein the infill rail fills a gap between the panel and the integrated cover of the torsion box to provide a substantially continuous outer aerodynamic surface.

3. An aerofoil structure according to claim 1, wherein at least some pairs of adjacent brackets of the bracket strip are connected by flexible connections.

4. An aerofoil structure according to claim 1, wherein the bracket strip is used to connect cabling to the torsion box.

5. An aerofoil structure according to claim 1, wherein the aerofoil structure is an aircraft fixed wing.

6. An aerofoil structure according to claim 1, wherein the bracket strip and the infill rail are integrally formed.

7. An integrated bracket assembly for attachment to a convex outer corner surface of a torsion box of an aerofoil structure, the bracket assembly comprising a bracket strip having a plurality of brackets arranged spaced side by side, and connected by an infill rail integrally formed with the bracket strip, wherein the infill rail has a concave surface for mating with the convex surface of the torsion box.

8. The bracket strip of claim 1, wherein each bracket comprises a shoe fitting having a generally L-shaped bracket part with lateral side supports.

9. The bracket strip of claim 1, wherein at least some pairs of adjacent brackets are connected by a flexible connection.

10. The bracket strip of claim 1, wherein a spacing between the brackets is regular.

11. The bracket strip of claim 1, wherein a spacing between the brackets is irregular.

12. The bracket strip of claim 1, wherein the brackets have a commonly dimensioned bracket width.

13. The bracket strip of claim 1, wherein the brackets have differently dimensioned bracket widths.

14. The bracket strip of claim 1, wherein the bracket at one end of the strip further includes an integrally formed infill block.

15. The bracket strip of claim 1, wherein the infill rail forms a step with the brackets.

16. The bracket strip of claim 1, wherein the brackets include fastener receiving holes.

17. The bracket strip of claim 1, including thermoplastic material.

18. The bracket strip of claim 17, including thermoplastic fibre composite material, wherein the fibres are preferably of carbon.

19. The bracket strip of claim 1, which is a moulded component.

* * * * *